United States Patent [19]

Fukuchi

[11] 4,452,294

[45] Jun. 5, 1984

[54] COUPLING STRUCTURE FOR A SCREEN WITH A FIXING ROD

[75] Inventor: Shigeki Fukuchi, Tokyo, Japan

[73] Assignee: Metako Kigyo Co., Ltd., Tokyo, Japan

[21] Appl. No.: 435,420

[22] Filed: Oct. 20, 1982

[30] Foreign Application Priority Data

Oct. 23, 1981 [JP] Japan ................................ 56-169703

[51] Int. Cl.³ ............................................ A47H 23/01
[52] U.S. Cl. ..................................... 160/395; 160/384
[58] Field of Search ............... 160/395, 313, DIG. 15, 160/384, 392, 395 U, 395 P, 392 D, 384 A, 384 T, 384 E

[56] References Cited

U.S. PATENT DOCUMENTS

| | | | |
|---|---|---|---|
| 2,335,361 | 11/1943 | Schiller | 160/395 |
| 3,524,491 | 8/1970 | Olson | 160/395 |
| 3,875,623 | 4/1975 | Johnston | 160/392 |
| 4,201,359 | 5/1980 | Baslow | 160/392 X |

FOREIGN PATENT DOCUMENTS 2305602 8/1973 Fed. Rep. of Germany .
7507473 12/1976 Netherlands ........................ 160/395

Primary Examiner—Ramon S. Britts
Assistant Examiner—Cherney S. Lieberman

[57] ABSTRACT

A coupling structure for a screen with a fixing rod comprises the screen having at its end a predetermined length of an accessory section provided with a pair of rigid engaging plates, and the fixing rod having a pair of curved side walls separated by an intermediate partition for forming a pair of coupling chambers. The pair of rigid engaging plates holding the accessory section therebetween are inserted and propped within the coupling chamber. The accessory section has a length enough to cover an outer face of the side wall for obtaining a good appearance.

8 Claims, 11 Drawing Figures

COUPLING STRUCTURE FOR A SCREEN WITH A FIXING ROD

FIELD OF THE INVENTION

This invention relates to a coupling structure for a screen with a fixing rod. More particularly, the invention relates to a coupling structure in which a suspending screen, such as a screen cloth of a roll screen, a partitioning curtain or the like, is coupled conveniently and quickly with a fixing rod, such as a so-called "bottom bar" having a hollow coupling chamber, of sufficient weight for stretching the screen to give a good appearance and for preventing application of locally concentrated stress which might cause breakage of the screen.

BACKGROUND OF THE INVENTION

The screen, including a screen cloth and a curtain cloth, has been conventionally combined with a so-called bottom bar having sufficient weight for the purpose of stretching the screen. Coupling of the screen with the bar has hitherto been carried out through adhesion of the screen to the bar or through reception of the bar into a cylindrically sewed portion of the screen at its lower end. Alternatively, the bar is provided with a hollow coupling chamber, while the screen is fixedly provided at its free end with a rigid engaging plate which is received obliquely within the hollow chamber in such a way that the engaging plate at its side edges is propped against inner walls of the chamber.

With the former method, the adhesion or sewing work is troublesome and time-consuming. Especially upon repitition of pulling and winding operations in a roll screen unit, the screen is often subjected to shock such as to cause a locally concentrated stress which results in damage and breakage of the screen. With the latter method, on the other hand, convenient coupling operation may be achieved but the bar is naked to the eye, so that its appearance is not so good for an interior appliance or decoration.

It has now been found that the foregoing problems of the conventional coupling structure of the screen with the bottom bar may be solved by providing the screen at its lower end with an accessory section having a pair of rigid engaging plates which in turn are wedged within the coupling chamber of a novel fixing rod while covering an outer face of the fixing rod with the accessory section.

SUMMARY OF THE INVENTION

An object of the invention is to provide a coupling structure of a screen with a fixing rod, which comprises the screen having at its lower end a predetermined length of an accessory section provided thereon with a pair of rigid engaging plates, and the fixing rod having a pair of curved side walls separated oppositely and symmetrically by an intermediate partitioning wall thereby forming a pair of coupling chambers in a groove form, the pair of rigid engaging plates secured on the accessory section being put together once over the other and inserted into one of the coupling chambers of the fixing rod in such a way that the inserted engaging plates are obliquely wedged within the coupling chamber, and the accessory section of the screen covering an outer face of the side wall and at its free end being inserted into the same or the other coupling chamber and secured thereon.

PREFERRED EMBODIMENTS OF THE INVENTION

In accordance with the invention, one of the side walls at its free end is preferably bent inwardly within the coupling chamber to form a bent piece and the engaging plates holding the accessory section therebetween are propped against the bent piece of the side wall.

A pair of rigid engaging plates may be securely positioned on one or both faces of the accessory section in an upper and lower relation or in an inside and outside relation.

The accessory section should have a length sufficient to secure the rigid engaging plates within the coupling chamber of the fixing rod and to cover a front or a whole outer face of the fixing rod.

In accordance with the invention one or more fixing rods may be used as a repeating or relaying element for consecutively combining a plurality of the screens. In this case, one screen with the accessory section holding the rigid engaging plates is engaged within one of the pair coupling chambers of the fixing rod, while another screen also with the accessory section holding the rigid engaging plates is engaged within the other coupling chamber.

The invention will be described in more detail hereinafter with reference to the accompanying drawings.

DETAILED DESCRIPTION OF THE INVENTION

Figure 2:
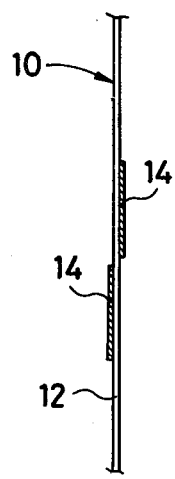
FIG. 2 is a side view of the essential portion of the screen.
Figure 5:
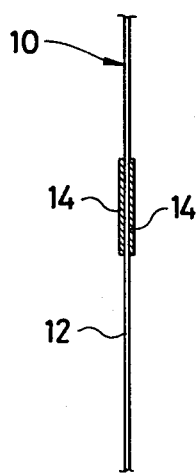
FIG. 5 is a side view of another embodiment of the screen.
Figure 8:
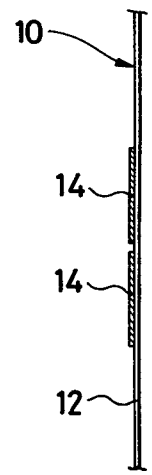
FIG. 8 is a side view of still another embodiment of the screen.

In the Figures, a suspending screen 10, such as a screen cloth receivable within a roll screen unit or a curtain cloth for partition, has at its free end a predetermined length of an accessory section 12 for covering a fixing rod 16, as described hereinbelow. The accessory section 12 is provided on its one or both faces with a pair of rigid engaging plates 14, 14 in an upper and lower relation as best shown in FIGS. 2 and 8, or in an inside and outside relation as best shown in FIG. 5.

Figure 1:
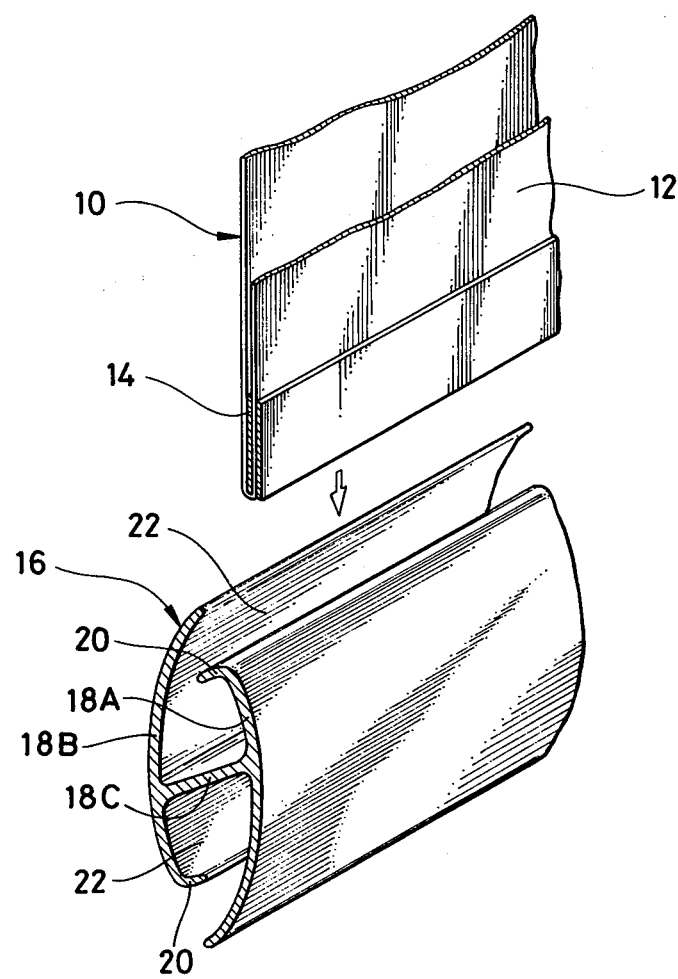
FIG. 1 is a perspective view of the coupling structure before coupling, or the screen and the fixing rod, according to the invention.

On the other hand, a fixing rod 16 is connected to the screen 10 for adequately stretching the latter. The fixing rod 16 having an adequate weight for stretching the screen 10 comprises a pair of opposite side walls 18A, 18B and a partitioning 18C for separating the pair of side walls and forming a pair of coupling chambers 22, 22 in a groove configuration, as shown in FIG. 1. Either one of the side walls 18A or 18B at its free end is bent inwardly for forming an engaging bent piece 20. In the illustrated embodiments, the fixing rod 16 is generally in the shape of ellipsoid in cross-section having a center cross bar or in the somewhat rounded H-shape, thus defining a pair of coupling chambers 22 as best shown in FIG. 1. In this case, the side walls 18A, 18B forms an outer shell of the fixing rod 16. The partitioning wall 18C is somewhat tilted and thus one of the side walls 18B is higher than the other 18A.

The rigid engaging plate 14 has a width not less than that of the coupling chamber 22 but not larger than a depth of the latter. The rigid plate 14 is not flexible in the lateral and vertical directions.

As shown in FIG. 1, the screen 10 is bent along the rigid engaging plate 14 at its lower end. The screen 10 and rigid plates 14 so stacked are inserted into the coupling chamber 22 of the fixing rod 16 and propped at their side edges against the side wall 18B on one side and the inside (see FIG. 3) corner of the bent piece 20 on the other side.

Figure 3:
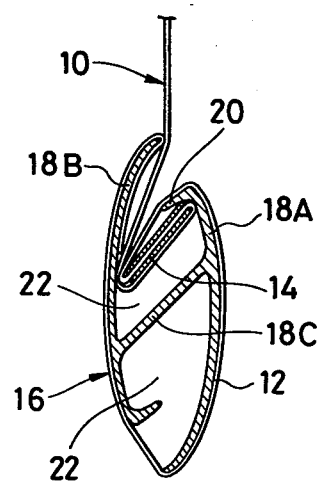
FIG. 3 is a sectional view of the fixing rod wholly covered with the accessory section of the screen.
Figure 4:
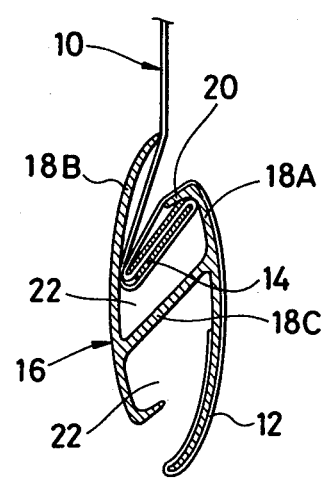
FIG. 4 is a sectional view of another embodiment of the invention in which the fixing rod is partially or only at its front face covered with the accessory section.
Figure 6:
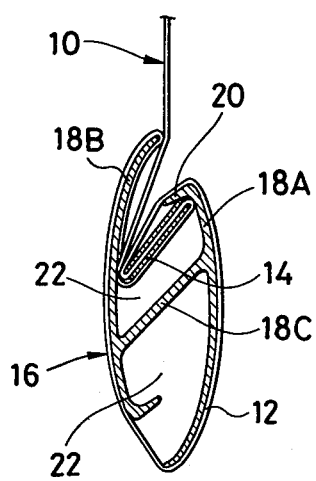
FIG. 6 is a sectional view of the fixing rod coupled and wholly covered with the screen of FIG. 5.
Figure 7:
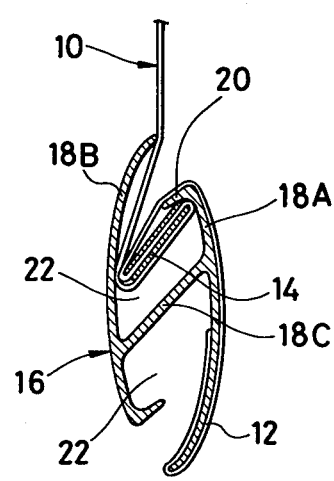
FIG. 7 is a sectional view of the fixing rod similarly to that of FIG. 6 but partially or only at its front face covered with the screen of FIG. 5.
Figure 9:
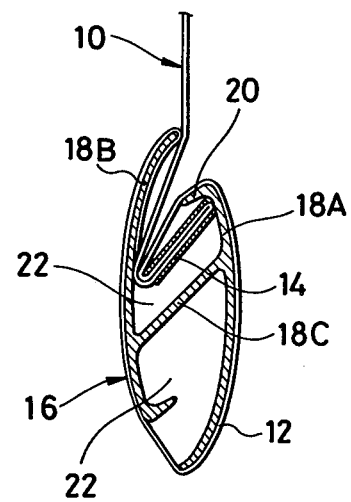
FIG. 9 is a sectional view of the fixing rod coupled with and wholly covered with the screen of FIG. 8.
Figure 10:
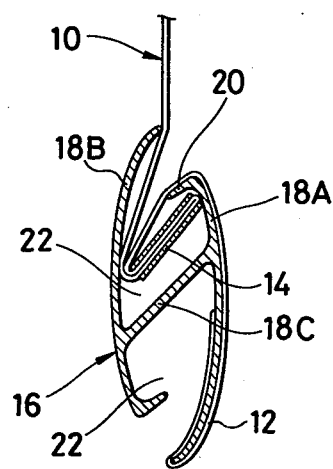
FIG. 10 is a sectional view of the fixing rod similarly to FIG. 8 but only at its front face covered with the screen of FIG. 8.
Figure 11:
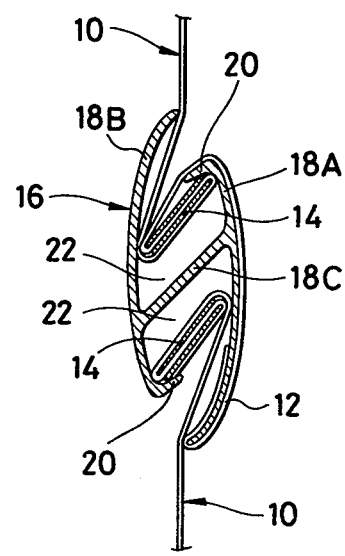
FIG. 11 is a sectional view of the fixing rod coupled with a plurality of the screens in which the fixing rod is utilized as a repeating or relaying element for consecutively combining a plurality of screens.

The accessory section 12 of the screen 10 is bent at the rigid engaging plate 14 and inserted into the coupling chamber 22. In this case, a major portion of the accessory section 12 is drawn out of the upper chamber 22 and is extended over the whole outer face of the fixing rod 16. Thereafter, the accessory section 12 at its free end is brouhgt toward the backside of the screen 10 and then inserted again into the coupling chamber 22, as shown in FIGS. 3, 6 and 9. Alternatively, the accessory section 12 at its free end is inserted into the lower coupling chamber 22 after having covered only over the front face of the fixing rod 16, as shown in FIGS. 4, 7 and 10. In this case, the free end of the accessory section 12 may be secured onto the inside of the wall 18A with an adhesive. Alternatively, as shown in FIG. 11, a plurality of the screens may be joined together with one or more fixing rods, which may thus serve as a series of coupling elements. In this case, one screen with the accessory section holding the rigid plates 14 is engaged within one of the pair of coupling chambers, while another screen similarly with its accessory section holding the rigid plates is engaged within the other chamber.

In accordance with the invention, a pair of the rigid engaging plates 14, 14 may be attached onto the accessory section 12 with, for example, an adhesive in an upper and lower relation on one surface (FIG. 8) or on both surfaces (FIG. 2), or in an inside and outside relation on both surfaces (FIG. 5). In either case, the screen 10 is bent along one of the rigid plates 14 so as to hold the section therebetween and define a predetermined length of the accessory section 12 enough to cover the outer face of the fixing rod 16.

Thus, the coupling structure according to the invention comprises the screen 10, having at its end a predetermined length of the accessory section 12, provided thereon with a pair of the rigid engaging plates 14, 14, and the fixing rod 16 consisting of a pair of the curved side walls 18A, 18B one of which is provided at its end with the bent piece 20 and which are separated symmetrically by an intermediate partitioning wall 18C for forming a pair of coupling chambers 22, 22 in a groove form. The pair of rigid engaging plates 14, 14 are attached to the screen and related to one another, as shown in FIG. 1, and inserted into one of the coupling chambers 22 in such a way that the inserted rigid engaging plates 14, 14 holding the screen section therebetween are obliquely propped within the coupling chamber 22. Then, a major length of the accessory section 12 is pulled out of the chamber 22 and extended over the outer face of the side wall of the fixing rod 16, and then at its free end is again inserted into either one of the coupling chambers 22, 22. Thus, coupling of the screen 10 with the fixing rod 16 may be achieved very conveniently and rapidly with the fixing rod 16 being covered over its front or whole outer face with the accessory section 12, resulting not only in a better appearance or decorative effect but also in reducing the effects of locally concentrated stresses which might cause breakage of the screen.

Since the rigid engaging plates 14 are obliquely propped at one end against the bent piece 20 and at the other end against the wall 18B, the screen is capable of providing sufficient force on the rigid engaging plates, thereby providing steady and stable engagement within the coupling chamber 22. Especially when the screen 10 is large, its heavy weight increases the engaging force of the rigid plate 14 within the coupling chamber 22, so that accidental detachment of the fixing rod is difficult and thus a more stable and reliable engagement may be achieved.

Although the rigid engaging plate 14 may be inserted into the coupling chamber 22, by use of a slidable means slight movement of the rigid plate 14 within the chamber 22 enables the quick and convenient engagement to be effected due to the relation of width of the rigid plate 14 to width and depth of the coupling chamber 22 and due to wide opening of the chamber 22. Contrary to the conventional structure with the slidable means, the coupling structure according to the invention eliminates a special machining in the opening and the hollow space of the chamber 22, resulting in a simple construction. In addition, once the rigid plate 14 has been obliquely engaged within the coupling chamber 22 or propped at its upper edge against the inside corner of the bent piece 20 of the wall 18A and at its lower edge against the inside of the wall 18B, the rigid plate 14 and the screen 10 cannot readily be slipped out of the coupling chamber 22. Furthermore, the large space in the chamber 22 may be utilized for the screen 10 not to generate a local stress, thereby preventing the screen 10 from breakage.

A pair of rigid engaging plates 14, 14 are arranged at suitable locations on the screen 10 and hold the latter therebetween upon insertion into the coupling chamber 22, so that the increased strength and rigidity enhance the propping force, providing more stable engagement.

The accessory section 12 of the screen 10 may cover the front or the whole outer face of the fixing rod 16 so that the fixing rod 16 is not naked to the eye and therefore very good appearance may be achieved. Contrary to the conventional screen with a cylindrically sewed portion for inserting the bottom bar, the screen of the invention has no locally weak points which might cause breakage, allowing the coupling to be maintained semipermanently. When used in the roll screen unit, the screen of the invention is more resistant to shocks caused by repeated pulling and winding operations.

As described hereinabove, in accordance with the invention, the coupling of the suspending screen with the fixing rod having the hollow chambers by means of a pair of the rigid engaging plates and the accessory section of the screen not only facilitates the stretching operation but also provides the better appearance suitable for interior applications due to the covering effect of the accessory section over the fixing rod. Furthermore, localized stresses leading to breakage of the screen may be eliminated, allowing the coupling to be maintained semipermanently.

Since the fixing rod of the invention is provided with a pair of symmetrical coupling chambers, it may be utilized not only for a so-called bottom bar but also as series of coupling structures.

Although the invention has been described hereinabove with reference to the preferred embodiments, several variations and modifications may be made without departing from the spirit and scope of the invention.

What is claimed is:

1. A coupling structure for coupling a screen with a fixing rod, comprising a screen having at its end portion a predetermined length of an accessory section provided with a pair of rigid engaging plates, a fixing rod of generally elliptical cross-section and constituted by spaced side walls symmetrically interconnected by an intermediate partitioning wall defining with said side walls a pair of open ended coupling chambers, said pair of rigid engaging plates on the accessory section being oriented in superposed relation and disposed in one of the coupling chambers of said fixing rod in oblique disposition for continuously engaging at its opposite ends the wall of the coupling chamber within which the rigid engaging plates are disposed, said accessory section having a length beyond the fixed plates for covering the outer face of the fixing rod and for insertion in at least one of the chambers thereof.

2. A coupling structure as recited in claim 1, wherein said pair of rigid engaging plates is securely positioned on both faces of said accessory section in upper and lower relation with each other.

3. A coupling structure as recited in claim 1, wherein said pair of rigid engaging plates is securely positioned on one face of said accessory section in upper and lower relation with each other.

4. A coupling structure as recited in claim 1, wherein said pair of rigid engaging plates is securely positioned on both faces of said accessory section in both vertical and horizontal alignment with each other.

5. The coupling structure as claimed in claim 1, wherein one side wall at its free end is bent inwardly within the coupling chamber to form a bent piece and the engaging plates holding the accessory section therebetween are propped against the bent piece of the side wall.

6. The coupling structure as claimed in claim 1, wherein the accessory section has a length enough to secure the rigid engaging plates within the coupling chamber of the fixing rod to cover at least one front face of the fixing rod.

7. The structure of claim 1 wherein one or more fixing rods are used as a repeating element for consecutively combining a plurality of the screens, in which one screen with the accessory section holding the rigid engaging plates is engaged within one of the pair coupling chambers of the fixing rod while another screen with the accessory section, holding the rigid engaging plates is engaged within the other coupling chamber.

8. The structure of claim 5 wherein one or more fixing rods are used as a repeating element for consecutively combining a plurality of the screens, in which one screen with the accessory section holding the rigid engaging plates is engaged within one of the pair coupling chambers of the fixing rod while another screen with the accessory section, holding the rigid engaging plates is engaged within the other coupling chamber.

* * * * *